United States Patent [19]
Chiu

[11] Patent Number: 6,047,869
[45] Date of Patent: Apr. 11, 2000

[54] BICYCLE CARRYING FRAME ON A VEHICLE

[76] Inventor: Michael Chiu, 1Fl, 1, Alley 16, Lane 40, Tinn Te Rd., Taichung, Taiwan

[21] Appl. No.: 09/332,390

[22] Filed: Jun. 14, 1999

[51] Int. Cl.[7] .................................................. B60R 9/10
[52] U.S. Cl. ...................... 224/314; 224/493; 224/500; 224/513; 224/537; 224/924
[58] Field of Search .................................. 224/924, 314, 224/513, 492, 493, 500, 501, 537; 211/17, 18, 19, 20

[56] References Cited

U.S. PATENT DOCUMENTS

| | | | |
|---|---|---|---|
| 3,275,206 | 9/1966 | Croft | 224/924 |
| 4,767,037 | 8/1988 | De Lellis | 224/924 |
| 4,823,997 | 4/1989 | Krieger | 224/501 |

*Primary Examiner*—Linda J. Sholl

[57] ABSTRACT

A bicycle carrying frame includes a first part having a first bar and a neck link extending transversely and inclinedly from the mediated portion of the bar which is connected to the trunk lid by strips. A second part has a second bar and a connecting link intersectionally connected to the second bar. The first end of the connecting link is connected to the neck link and the second bar contacts against the rear bumper of the vehicle. A third part is connected to the second end of the connecting link and has two rings connected to two ends thereof so that the bicycle wheels are respectively supported by the two rings.

5 Claims, 5 Drawing Sheets

BICYCLE CARRYING FRAME ON A VEHICLE

FIELD OF THE INVENTION

The present invention relates to a bicycle carrying frame on a vehicle and the frame is composed of three parts, the first part is connected to the trunk lid, the second part is engaged with the rear bumper and the third part has two rings for supporting the bicycle wheels.

BACKGROUND OF THE INVENTION

A conventional bicycle carrying frame for a vehicle generally has a complicated structure and holes are necessary drilled through the steel boards of the vehicle so as to install the bicycle carrying frame to the vehicle. Furthermore, when connecting a bicycle to the bicycle carrying frame, a lot of strips are used to fasten the bicycle to the frame. The bicycle is not secure on the vehicle especially when the vehicle is ridden on a rugged road.

The present invention intends to provide a bicycle carrying frame which includes three parts each is adjustable of its length. The first part is connected to the trunk lid by strips, the second part is engaged with the rear bumper and the third part has two rings to support the bicycle wheels. A strip is connected between the seat post and the first part. The structure of the bicycle carrying frame is simple and the procedures for attaching the bicycle to the frame is easy.

SUMMARY OF THE INVENTION

In accordance with one aspect of the present invention, a bicycle carrying frame is provided and comprises a first part having a first bar and a neck link extends transversely and inclinedly from the mediated portion of the bar. A second part has a second bar and a connecting link is intersectionally connected to the second bar. The first end of the connecting link is connected to the neck link. A third part is connected to the second end of the connecting link and has two rings connected to two ends of the third part.

The object of the present invention is to provide a bicycle carrying frame on a vehicle, wherein the size of the frame can be adjusted and the structure of the frame is simple.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
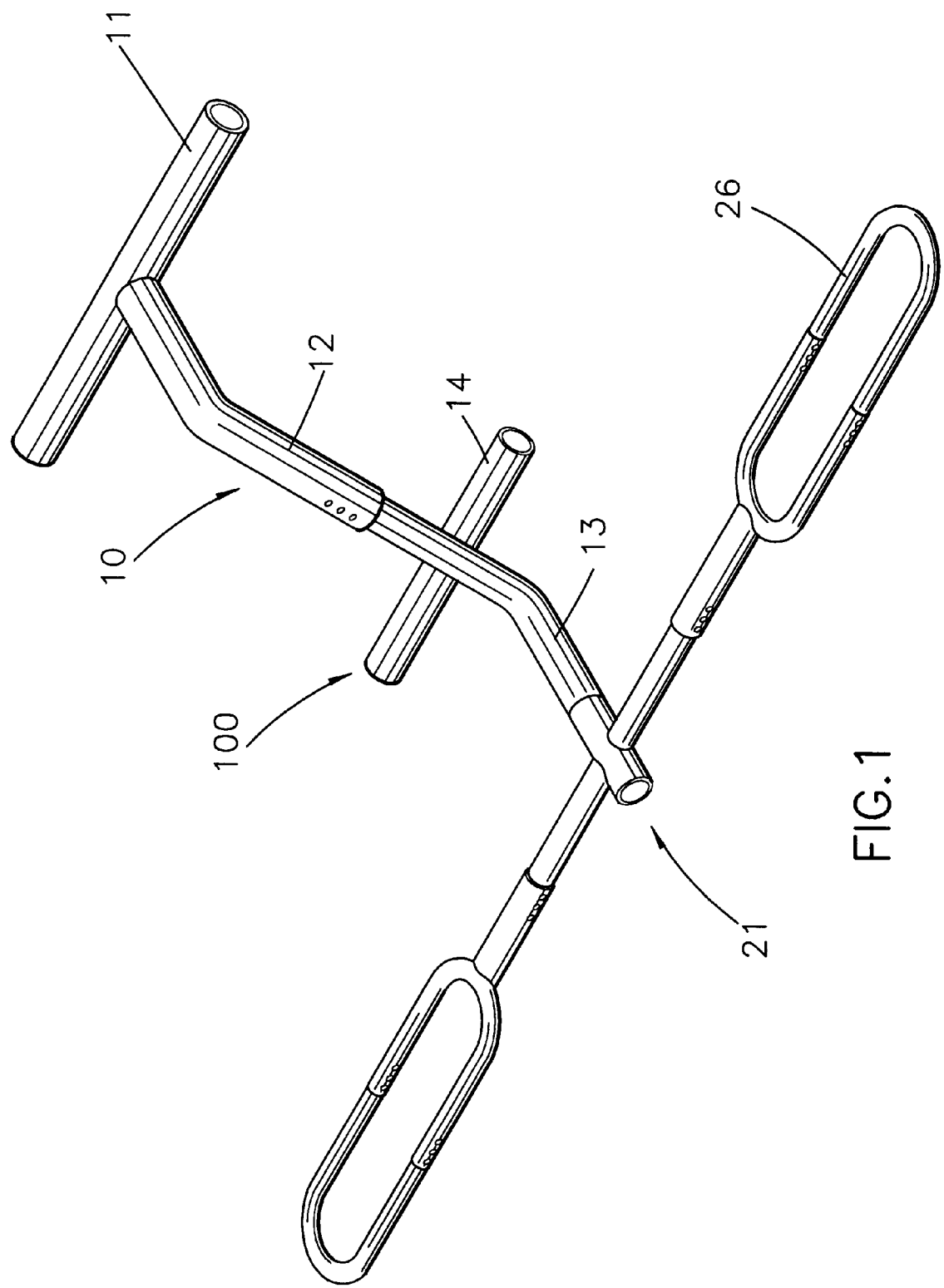
FIG. 1 is a perspective view of the bicycle carrying frame in accordance with the present invention.
Figure 2:
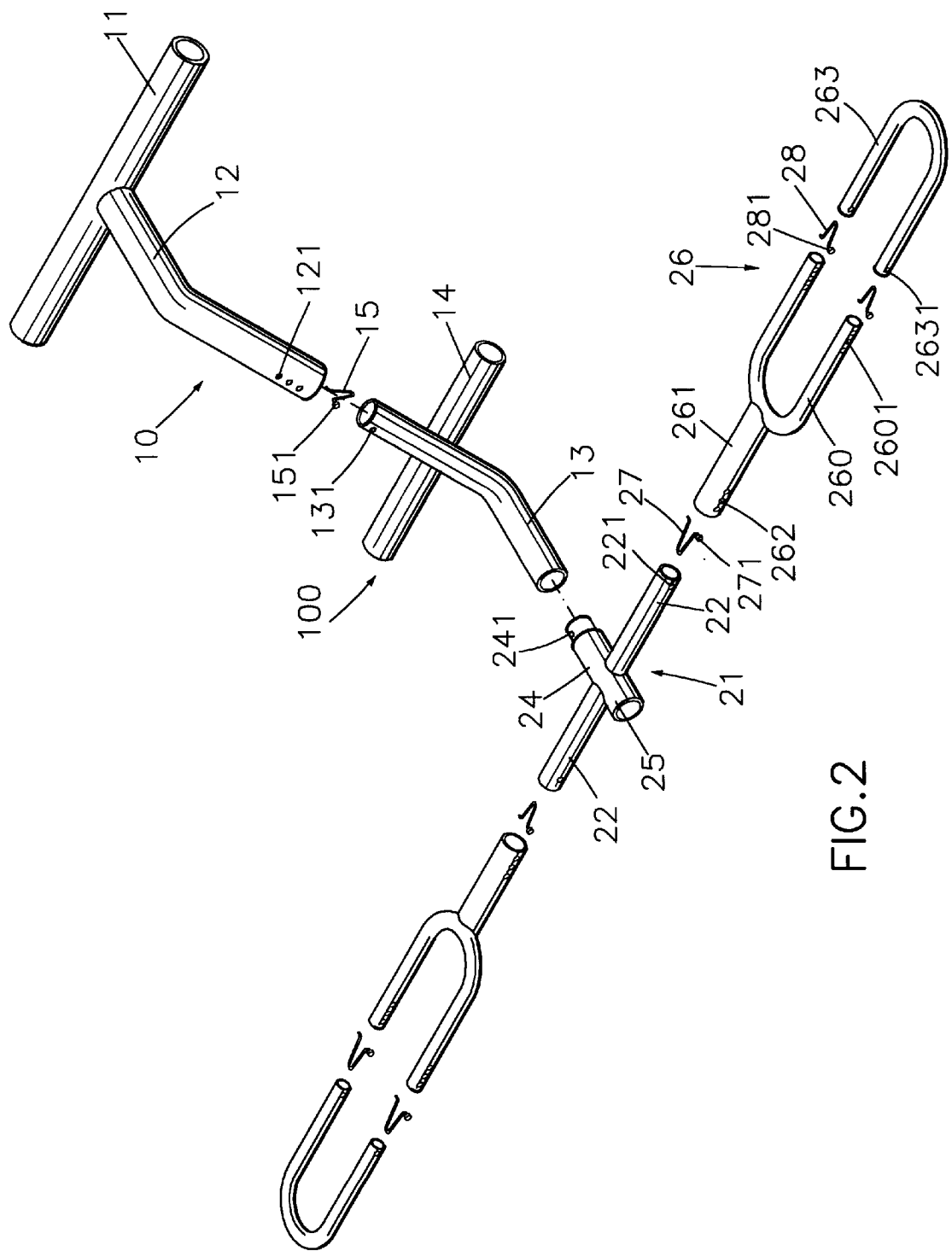
FIG. 2 is an exploded view of the bicycle carrying frame in accordance with the present invention.
Figure 3:
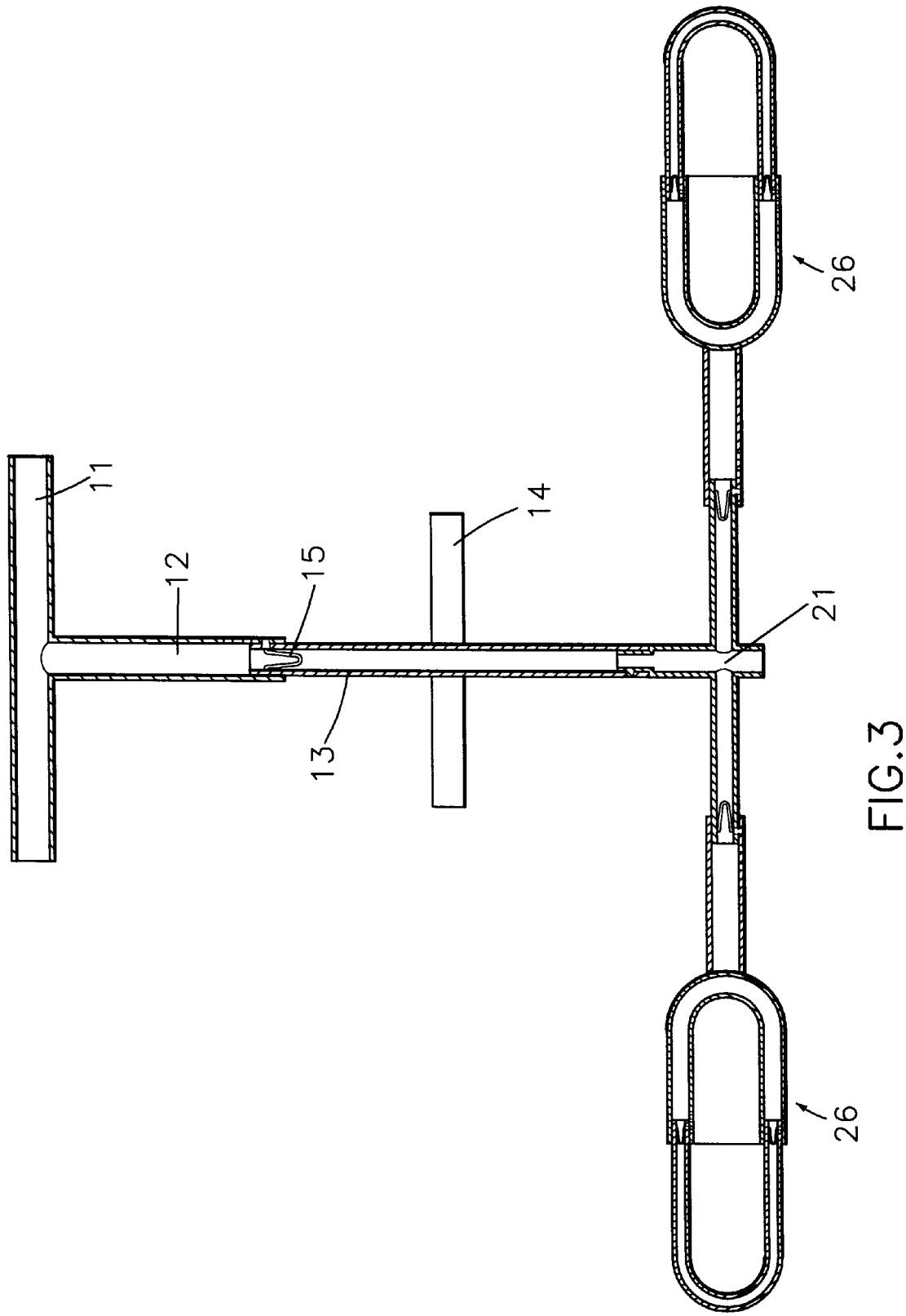
FIG. 3 is a side elevational view, partly in section, of the bicycle carrying frame in accordance with the present invention.

Referring to FIGS. 1 to 3, the bicycle carrying frame in accordance with the present invention comprises a first part (10), a second part (100) and a third part (21). The first part (10) has a first bar (11) and a neck link (12) extends transversely and inclinedly from the mediated portion of the bar (11) so that two strips (40) (FIG. 4) can be used to connect the first bar (11) to the upper edge of the trunk lid (30).

The second part (100) has a second bar (14) and a connecting link (13) is intersectionally connected to the second bar (14). The first end of the connecting link (13) is connected to the neck link (12). The neck link (12) has three apertures (121) defined through the wall thereof and the first end of the connecting link (13) has a position hole (131) defined through the wall thereof. A positioning member (15) is received in the connecting link (13) and has a protrusion (151) which extends through the positioning hole (131) and one of the apertures (121) of the neck link (12) so that the distance between the first bar (11) and the second bar (14) can be adjusted. It is to be noted that the second bar (14) can be engaged with the rear bumper (50) of the vehicle.

The third part (21) has a connecting tube (24) which has a ball extending radially outward therefrom so as to be connected to the second end of the connecting link (13). The third part (21) has two connecting ports (22) so as to be respectively connected to two respective rings (26). Each ring (26) has a connecting tube (261) extending radially outward therefrom which are connected to the two connecting ports (22). Each connecting tube (261) has three apertures (262) defined through the wall thereof and each connecting port (22) has a positioning hole (221) defined through the wall thereof. Two positioning members (27) are respectively received in the two connecting ports (22) and each positioning member (27) has a protrusion (271) which extends through the positioning hole (221) and one of the apertures (262) of the connecting tube (261) so that the distance between the two rings (26) can be adjusted. Each ring (26) includes a first U-shaped portion (260) and a U-shaped second portion (263). The first U-shaped portion (260) has two ends each have three apertures (2601) defined through the wall thereof and the second U-shaped portion (263) has two ends each have a positioning hole (2631) defined through the wall thereof Two positioning members (28) are respectively received in the two ends of the first U-shaped portion (260) and each positioning member (28) has a protrusion (281) which extends through the positioning hole (2631) and one of the apertures (2601) of the first U-shaped portion (260).

Figure 4:
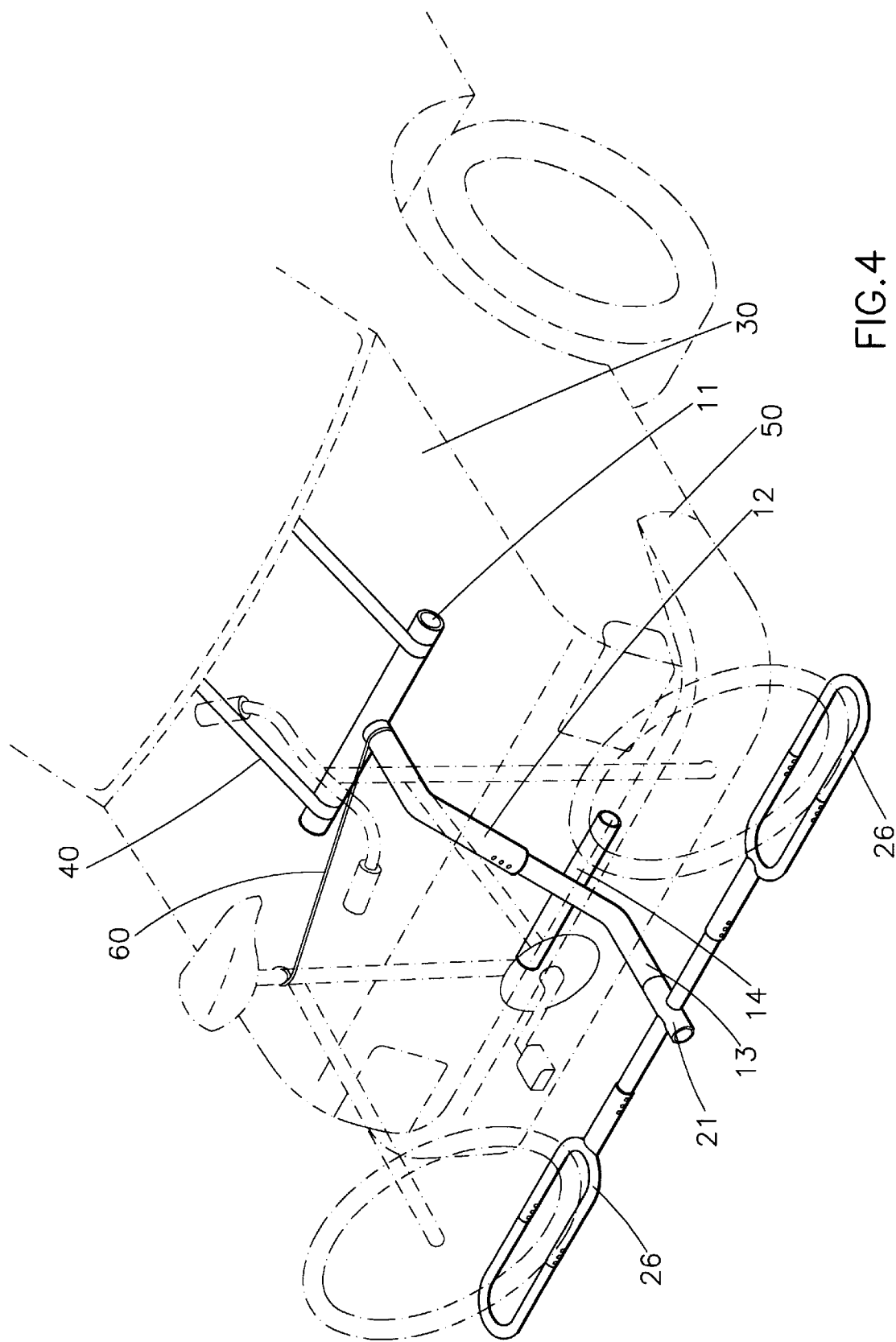
FIG. 4 is an illustrative view to show a bicycle is carried by the bicycle carrying frame of the present invention.

Therefore, as shown in FIG. 4, the bicycle is easily carried by placing two wheels of the bicycle on the two rings (26) and a strip (60) is connected between the seat post of the bicycle and the first part (10) so that the bicycle is easily secure on the frame.

Figure 5:
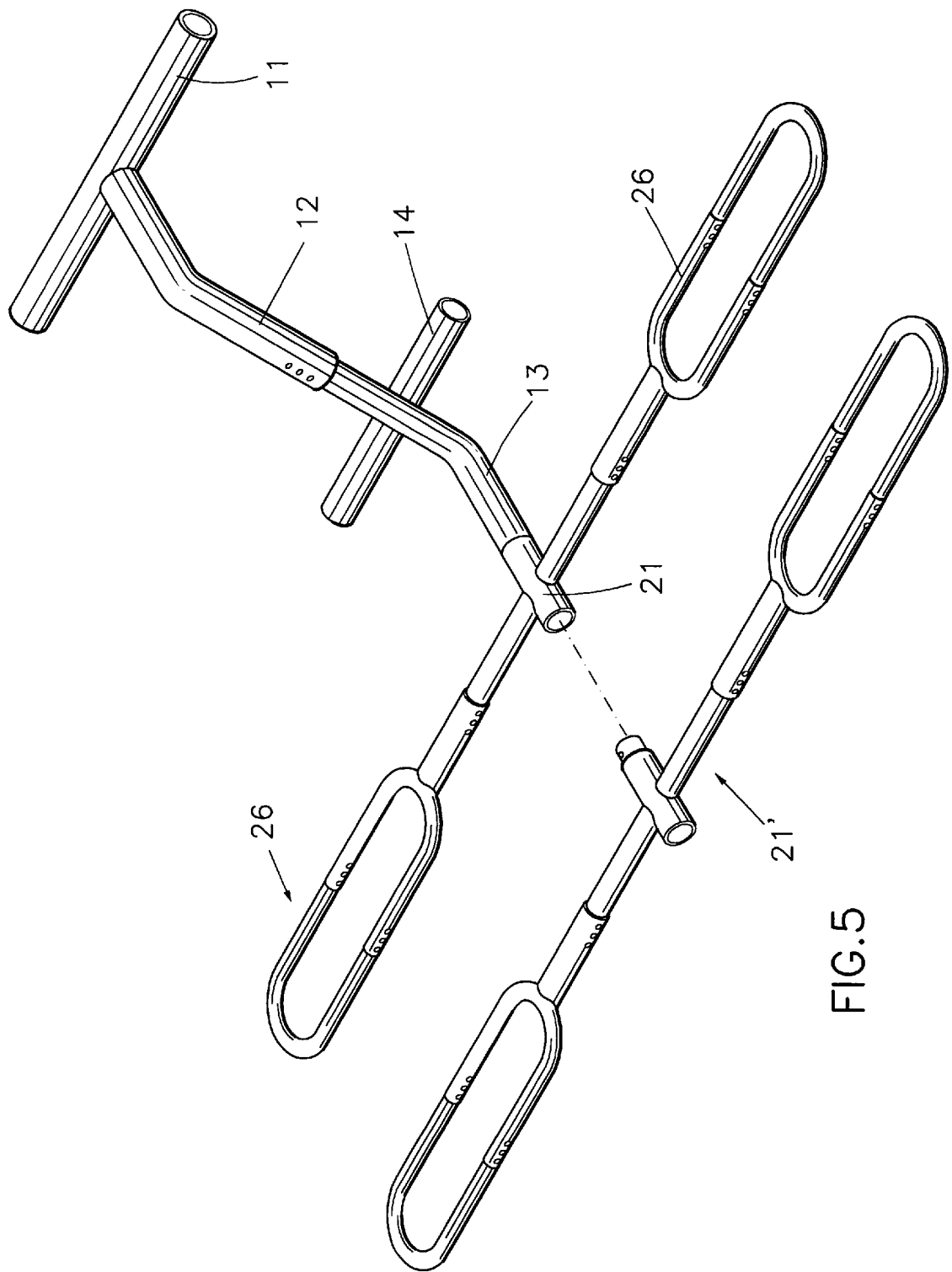
FIG. 5 is an illustrative view to show the bicycle carrying frame of the present invention can be added a further third part.

Referring to FIG. 5, a further third part (21') can be connected to the third part (21) by the manner similar to the engagement between the connecting tube (24) of the third part (21) and the connecting link (13) of the second part (100).

While we have shown and described various embodiments in accordance with the present invention, it should be clear to those skilled in the art that further embodiments may be made without departing from the scope and spirit of the present invention.

What is claimed is:

1. A bicycle carrying frame comprising:

a first part (10) having a first bar (11) and a neck link (12) extending transversely and inclinedly from the mediated portion of said bar (11);

a second part (100) having a second bar (14) and a connecting link (13) intersectionally connected to said second bar (14), the first end of said connecting link (13) connected to said neck link (12), and a third part (21) connected to the second end of said connecting link (13) and having two rings (26) connected to two ends of said third part (21).

2. The frame as claimed in claim 1, wherein said neck link (12) has three apertures (121) defined through the wall thereof and the first end of said connecting link (13) has a position hole (131) defined through the wall thereof, a positioning member (15) received in said connecting link (13) and having a protrusion (151) which extends through said positioning hole (131) and one of said apertures (121) of said neck link (12).

3. The frame as claimed in claim 1, wherein each ring (26) has a connecting tube (261) extending radially outward therefrom and said third part (21) has two connecting ports (22) which are respectively connected to said two respective connecting tubes (261).

4. The frame as claimed in claim 3, wherein each connecting tube (261) has three apertures (262) defined through the wall thereof and each connecting port (22) has a positioning hole (221) defined through the wall thereof, two positioning members (27) respectively received in said two connecting ports (22) and each positioning member (27) having a protrusion (271) which extends through said positioning hole (221) and one of said apertures (262) of said connecting tube (261).

5. The frame as claimed in claim 1, wherein each ring (26) includes a first U-shaped portion (260) and a U-shaped second portion (263), said first U-shaped portion (260) having two ends each having three apertures (2601) defined through the wall thereof and said second U-shaped portion (263) having two ends each having a positioning hole (2631) defined through the wall thereof, two positioning members (28) respectively received in said two ends of said first U-shaped portion (260) and each positioning member (28) having a protrusion (281) which extends through said positioning hole (2631) and one of said apertures (2601) of said first U-shaped portion (260).

* * * * *